United States Patent
Schröder

[11] Patent Number: 5,953,913
[45] Date of Patent: Sep. 21, 1999

[54] SYSTEM FOR AN ELECTRO-HYDRAULIC PRESSURE SUPPLY FOR A POWER-ASSIST DEVICE IN A MOTOR VEHICLE

[75] Inventor: Hans-Joachim Schröder, Wiesbaden, Germany

[73] Assignee: Mannesmann VDO AG, Frankfurt, Germany

[21] Appl. No.: 08/916,566

[22] Filed: Aug. 22, 1997

[30] Foreign Application Priority Data

Aug. 31, 1996 [DE] Germany .............................. 196 35 411

[51] Int. Cl.⁶ .................................................. F16D 31/00
[52] U.S. Cl. ............................ 60/325; 60/456; 417/423.1; 417/424.1
[58] Field of Search .................. 60/325, 456; 417/410.1, 417/423.12, 423.13, 424.1, 424.2

[56] References Cited

U.S. PATENT DOCUMENTS

| | | | |
|---|---|---|---|
| 2,669,187 | 2/1954 | Guyer | 417/423.12 X |
| 3,981,621 | 9/1976 | Considine | 417/423.12 X |
| 4,905,784 | 3/1990 | Yamashita | 91/375 A X |
| 5,151,016 | 9/1992 | Her | 417/423.12 X |
| 5,378,121 | 1/1995 | Hackett | 417/423.12 X |
| 5,648,694 | 7/1997 | Kobayashi et al. | 417/424.1 X |

FOREIGN PATENT DOCUMENTS

| | | |
|---|---|---|
| 4120665 | 12/1992 | Germany . |
| 4231784 | 3/1994 | Germany . |
| 4320692 | 1/1995 | Germany . |
| 29609701 | 8/1996 | Germany . |

OTHER PUBLICATIONS

Automobiltechnik, Neue Servolenkung spart Kraftstoff in: Krafthand—No. 17, Sep. 10, 1994, pp. 1282 and 1283.

*Primary Examiner*—Hoang Nguyen
*Attorney, Agent, or Firm*—Martin A. Farber

[57] ABSTRACT

A system for an electro-hydraulic pressure supply for a power-assist device in a motor vehicle in which, by a pump which is arranged in an oil-filled container and driven by an electric motor, the oil is conducted through an outlet opening to the power-assist device and returned from the power-assist device via a return opening into the container. A shaft of the electric motor is coupled with a shaft of the pump. In order to provide an arrangement for an electro-hydraulic pressure supply for power-assist devices which can be used also in small structural units, the shaft of the electric motor and the shaft of the pump are coupled in a central bearing.

4 Claims, 3 Drawing Sheets

SYSTEM FOR AN ELECTRO-HYDRAULIC PRESSURE SUPPLY FOR A POWER-ASSIST DEVICE IN A MOTOR VEHICLE

FIELD AND BACKGROUND OF THE INVENTION

The present invention relates to a system for an electro-hydraulic supplying of pressure for a power-assist device in motor vehicles, in which the oil is conducted by a pump driven by an electric motor and arranged in oil-filled container. The oil is conducted further through an outlet opening to the power-assist device and returned from the power-assist device into the container through a return opening, a shaft of the electric motor being connected with a shaft of the pump.

In automobile engineering, it is well known to produce power-assist systems by means of external hydraulic energy. In order to support the operation of the device, oil is conveyed under pressure into a closed pump circuit, the pump being driven by an electric motor.

The pump is arranged in an oil tank with the pump shaft being held in two pump bearings. The shaft of the electric motor is also held in two motor bearings.

Particularly in motor vehicles of the future which are intended for city traffic, less and less space is available for vehicle units. Nevertheless, it must be possible to operate these vehicles comfortably.

SUMMARY OF THE INVENTION

It is an object of the invention to provide a system for the electro-hydraulic supplying of pressure for power-assist devices, which can be used also in small structural units.

According to the invention, the shaft of the electric motor and the shaft of the pump are coupled in a central bearing.

The invention has the advantage that a space-saving electro-hydraulic pump system is provided in which no radial forces are transmitted from the motor to the pump. Thus a reliable manner of operation of the unit is assured. In addition, there is an optimal, short length of tubing for the hydraulic system, since the unit is no longer dependent on the place where the drive motor is installed.

The central bearing is advantageously arranged in an adapter which connects the electric motor to a plastic tank. In this way, a bearing is saved, since electric motor and pump share said bearing.

The structure can be further reduced in size if the central bearing is arranged on the side of the electric motor associated with the adapter.

In a further development, a motor electronics on the outer wall of the adapter is connected in heat-conductive manner to the adapter.

Due to the heat-conductive connection of the motor electronics to the adapter, the heat which is given off by the power electronics of the motor electronics is led away by the stream of oil conveyed through the adapter. In particular, when the adapter is made of metal, this cooling effect is still further increased. Additional cooling, such as, for instance, cooling plates, can then be dispensed with.

In another embodiment, the motor electronics is arranged in the electric motor itself.

In this arrangement, the electro-hydraulic pump system is a vibration-insensitive unit on the outside.

In addition to this, the number of mechanical parts (clamps, connectors, screw fastening points) is reduced. No cable harness is required for a connecting of the electric motor and electronics.

It is particularly advantageous in this connection if the motor electronics is a hybrid part which is arranged on the side of the electric motor facing the adapter and is connected in heat-conductive manner to the adapter.

Particularly upon the use of mechanical-electronic commutated motors, direct contacting of the carbon brushes of the electric motor with the electronics is possible, in which connection long cable paths can be dispensed with.

The invention permits of numerous embodiments.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
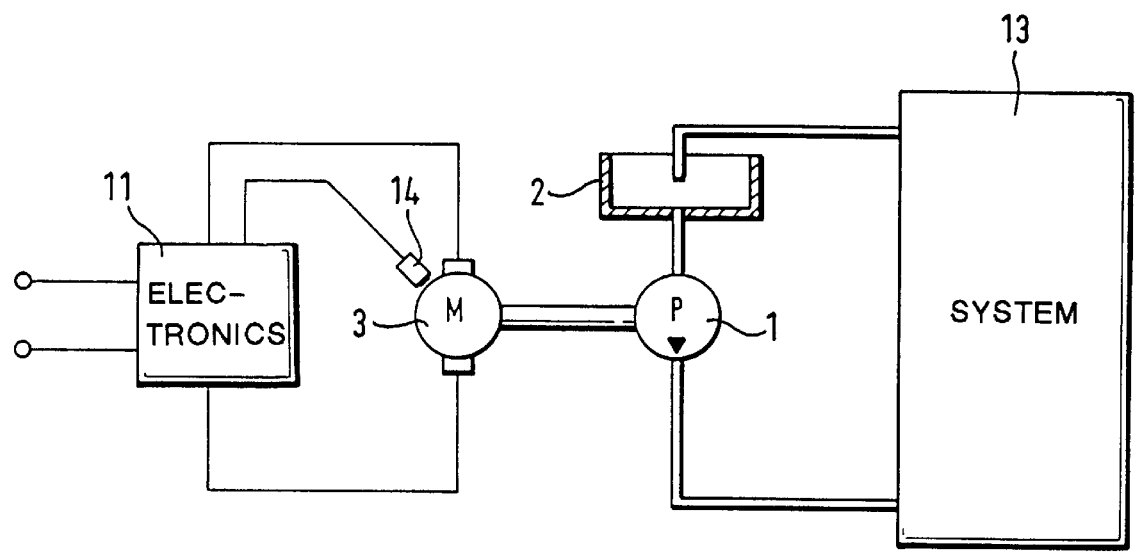
FIG. 1 is a system for controlling an electro-hydraulic pressure supply.

FIG. 1 diagrammatically shows an electro-hydraulic pump supply in which steering assistance is obtained via the oil pressure in a closed system 13. In order to keep the steering forces small even in case of a small steering ratio, the steering is assisted by oil under pressure which is transported within a closed circuit. The function of such power-assisted steering is well known and need therefore not be further described.

In order to regulate the oil pressure, a gear pump 1 is operated by an electric motor 3. A speed-detection device 14 detects the speed of rotation n of the electric motor 3 and forwards the signal to a motor electronics 11.

Figure 2:
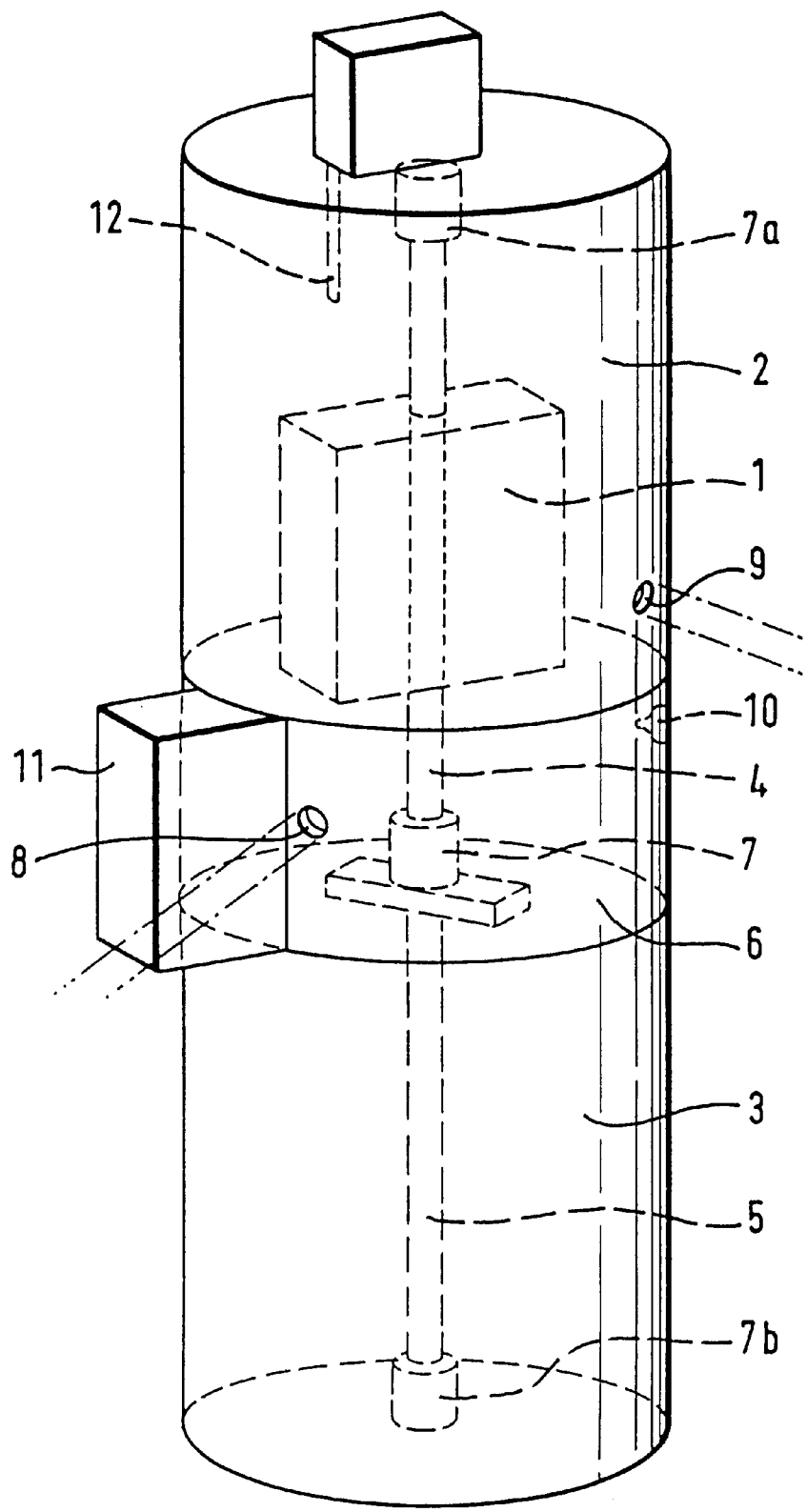
FIG. 2 shows a pump configuration of the invention in diagrammatic view.

In FIG. 2, the electro-hydraulic pump arrangement of the invention is shown as used for power steering in the motor vehicle.

The gear pump 1 is arranged in an oil-filled plastic tank 2 which has a dipstick 12 for detecting the contents of the tank. Adjoining the plastic tank 2 there is an adapter 6 which connects the electric motor 3 to the plastic tank 2.

The adapter 6 is part of the tank 2 and is open with respect to it so that the oil completely fills the adapter 6. By flow slits (not further shown) arranged in the adapter 6, the oil pumped by the pump 1 is transported to an outlet opening 8 on the adapter 6 and forced into a system of lines which is connected with the steering.

For the pressure-less return of the pressurized oil from the steering, a return opening 9 is provided on the plastic tank 2. In this way, the oil can be transported again to the steering by the pump 1.

The pump 1 is driven by the electric motor 3. The transmission of power from the electric motor 3 to the pump 1 is effected via the shaft 5 of the electric motor 3 which is coupled with the pump shaft 4 in a central bearing 7. The central bearing 7 is arranged, in space-saving manner, in the adapter 6. Opposite the adapter 6, the pump 1 has another bearing 7a and the electric motor has another bearing 7b.

Figure 4:
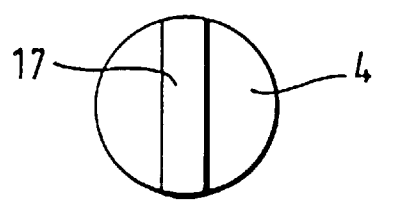
FIG. 4 is a cross section showing a coupling between motor shaft and pump shaft.
Figure 4:
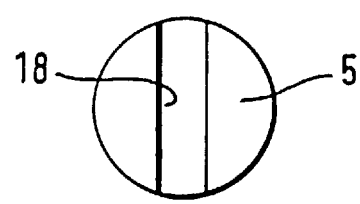

The coupling of the two shafts is effected in this connection in very simple manner thereby that a driver 17 which is arranged on the end of the pump shaft 4 engages within a suitable slit 18 on the end of the motor shaft 5 (FIG. 4).

The plastic tank 2, adapter 6, and motor 3 form a cylinder-shaped unit as seen from the outside.

A power electronics 11 is so arranged on the outer wall of the adapter 6 that the heat produced by the power electronics 11 is taken up by the oil present in the adapter, and the oil is transported in the vehicle and cooled there.

The power electronics 11 is a thick-film hybrid part, the electrically insulated side of the circuit board of which, facing away from the elements 16, rests against the wall of the adapter 6.

Figure 3:
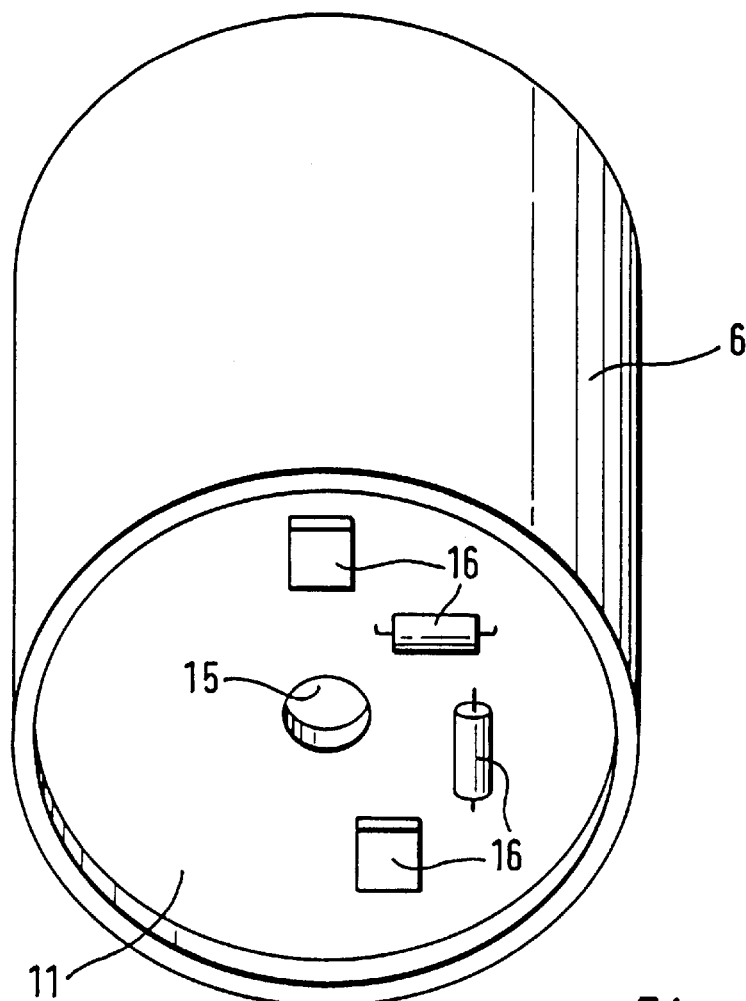
FIG. 3 shows the motor electronics on the adapter.

In another embodiment, the hybrid part 11 has a circular base surface which corresponds to the base surface of the electric motor and of the adapter. The hybrid part 11 is so mounted on the adapter 6 on the side facing the electric motor that the side of the circuit board which does not bear any components rests directly against the flat bottom side of the adapter 6, whereby the leading away of the heat is assured. The hybrid part 11 is located countersunk in a recess in the electric motor. In this connection, the motor shaft 5 is conducted through a central opening 15 in the hybrid part (FIG. 3).

I claim:

1. A system for an electro-hydraulic supplying of pressure for a power-assist device in motor vehicles, comprising:

an adapter having a central bearing, a pump, and an electric motor which drives the pump via the adapter, said adapter having an interior space for containment of oil;

a motor electronics unit for electrical operation of said motor;

a tank terminating in said adapter, said tank and said adapter constituting a container for storage of oil, the adapter having an outlet opening for directing oil to the power assist device, and said tank having a return opening for receiving oil from the power assist device, a wall of said adapter having a first side contacting the oil upon a filling of the container with the oil;

wherein the is located within said tank, and said motor electronics unit is mounted on a second side of said adapter wall opposite said first side of said wall for thermal communication with the oil;

the oil is conducted by the pump through the outlet opening to the power-assist device and returned from the power-assist device into the container through the return opening, a shaft of the electric motor being connected with a shaft of the pump at the central bearing; and a flow of the oil past said wall cools said motor electronics unit.

2. A system according to claim 1, wherein the central bearing is arranged on a side of the electric motor, which side is associated with the adapter.

3. A system according to claim 1, wherein said motor electroncis unit is connected in heat-conductive manner to the adapter.

4. A system according to claim 1, wherein said motor electronics unit is a hybrid part which is located on a side of the motor facing the adapter, and is connected in heat-conductive manner to the adapter.

* * * * *